(12) United States Patent
Evans

(10) Patent No.: US 7,552,125 B1
(45) Date of Patent: Jun. 23, 2009

(54) SYNERGISTIC DATA STRUCTURES

(75) Inventor: T. David Evans, Rutland, MA (US)

(73) Assignee: EMC Corporation, Hopkinton, MA (US)

( * ) Notice: Subject to any disclaimer, the term of this patent is extended or adjusted under 35 U.S.C. 154(b) by 261 days.

(21) Appl. No.: 11/386,884

(22) Filed: Mar. 22, 2006

(51) Int. Cl.
*G06F 17/30* (2006.01)

(52) U.S. Cl. .................. 707/10; 707/1; 707/2; 707/7; 707/8; 707/9; 707/101; 707/102; 707/103 R; 707/104.1

(58) Field of Classification Search .............. 707/1–10, 707/100–104.1, 200–206
See application file for complete search history.

(56) References Cited

U.S. PATENT DOCUMENTS

| 6,374,266 B1 * | 4/2002 | Shnelvar ............... 707/204 |
|---|---|---|
| 6,754,718 B1 | 6/2004 | Dobberpuhl et al. |
| 2005/0131883 A1 * | 6/2005 | Buxton et al. ............... 707/3 |

OTHER PUBLICATIONS

U.S. Appl. No. 11/325,494, filed Jan. 3, 2006.

* cited by examiner

*Primary Examiner*—Isaac M Woo
(74) *Attorney, Agent, or Firm*—Muirhead and Saturnelli, LLC

(57) ABSTRACT

Described are techniques for accessing data. The data is stored in a tree data structure at a first location. A hash value is determined in accordance with a portion of said data. An entry is created in a hash table in accordance with said hash value for said data. The entry includes a reference to said data at said first location, wherein said data is accessible at said first location using a first retrieval technique for said tree data structure and using a second retrieval technique for said hash table.

20 Claims, 13 Drawing Sheets

SYNERGISTIC DATA STRUCTURES

BACKGROUND

1. Technical Field

This application generally relates to data structures, and more particularly to techniques used in connection with data structures.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems, also referred to as server systems, may store and retrieve data using a storage device containing a plurality of host interface units, disk drives, and disk interface units. The host systems access the storage device through a plurality of channels provided therewith. Host systems provide data and access control information through the channels to the storage device, and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Data regarding the configuration of one or more data storage systems may be stored in a data structure such as a binary tree. If information about an element in the tree is desired, retrieval may be performed by searching the tree structure. Searching the tree structure may include starting at the root and performing a search, such as a depth first search or a breadth first search, to locate the desired element(s) in the structure. The amount of time to locate an element of the tree structure in connection with one or more operations, such as retrieval of information, may be unacceptable as the number of elements in the tree structure continue to increase. Thus, it may be desirable to utilize an alternative data structure and associated techniques for performing operations using information stored therein.

SUMMARY OF THE INVENTION

In accordance with one aspect of the invention is a method for accessing data comprising: storing the data in a tree data structure at a first location; determining a hash value in accordance with a portion of said data; and creating an entry in a hash table in accordance with said hash value for said data, said entry including a reference to said data at said first location, wherein said data is accessible at said first location using a first retrieval technique for said tree data structure and using a second retrieval technique for said hash table. The data may be configuration information about a data storage system. The tree data structure may include configuration information about said data storage system in which said configuration information is stored in said tree data structure in accordance with a defined hierarchy. The defined hierarchy may include physical configuration information, logical configuration information, and general configuration information about said data storage system. The tree data structure may be a binary tree, and said defined hierarchy may include peer relationships and embedded relationships, wherein nodes at a same peer level are represented as right children of one another, and nodes having an embedded relationship to another node are represented descendants of said other node. The method may also include retrieving information from said first location using said second retrieval technique, said first location corresponding to a root node of a subtree of said tree data structure; and retrieving other information from said subtree using said first retrieval technique and relationships between nodes of said subtree. The entry in said hash table may include a pointer to a node in said tree data structure. The entry in said hash table may include said data as a field of said entry and said first location corresponds to an address of said field. An agent of a data storage system may manage said configuration information, said agent may receive configuration information in accordance with said tree data structure and said defined hierarchy. The method may also include a driver communicating configuration information in a first format to a first routine, wherein said first routine uses one or more other routines to convert said first format to said tree data structure; sending said configuration information from said first routine in the form of said tree data structure to said agent; and accessing, by said agent, a portion of a combination data structure including said hash table and said tree data structure in connection with servicing a request. In connection with servicing a request, said agent may update said combination data structure with configuration information included in said tree data structure, wherein said agent uses one or more of said first retrieval technique and said second retrieval technique in connection with performing said update. In connection with servicing said request, said agent may retrieve configuration information from said combination data structure, wherein said agent uses one or more of said first retrieval technique and said second retrieval technique in connection with performing said accessing to retrieve requested configuration information, said requested configuration information being returned in a response. The data storage system may include a plurality of drivers, each of said drivers using a different library in accordance with a particular format of data used by said each driver, and wherein each of the different libraries uses a same library in connection with converting data in said particular format to said tree data structure utilized by said agent. The tree data structure may be a binary tree structure including nodes, each of said nodes being in accordance with a data format and a variable size, each of said nodes including a tag value identifying a type of configuration information stored in said node, wherein said hash value is determined using said tag value.

In accordance with another aspect of the invention is a method for accessing data comprising: storing the data in a first data structure at a first location, said first data structure representing hierarchical relationships between elements thereof in accordance with a defined hierarchy; determining a hash value in accordance with a portion of said data; and creating an entry in a hash table in accordance with said hash value for said data, said entry including a reference to said data at said first location, wherein said data is accessible at said first location using a first retrieval technique for said first data structure and using a second retrieval technique for said hash table.

In accordance with yet another aspect of the invention is a computer-readable medium including code stored thereon for accessing data, the computer-readable medium including code that: stores the data in a tree data structure at a first location; determines a hash value in accordance with a portion of said data; and creates an entry in a hash table in accordance with said hash value for said data, said entry including a reference to said data at said first location, wherein said data is accessible at said first location using a first retrieval technique for said tree data structure and using a second retrieval technique for said hash table. The data may be configuration information about a data storage system. The tree data structure may include configuration information about said data storage system in which said configuration information is stored in said tree data structure in accordance with a defined hierarchy, and wherein said defined hierarchy may include physical configuration information, logical configuration information, and general configuration information about said data storage system. The tree data structure may be a binary tree, and said defined hierarchy may include peer relationships and embedded relationships, wherein nodes at a same peer level are represented as right children of one another, and nodes having an embedded relationship to another node are represented descendants of said other node. The computer-readable medium may also include code that:

retrieves information from said first location using said second retrieval technique, said first location corresponding to a root node of a subtree of said tree data structure; and retrieves other information from said subtree using said first retrieval technique and relationships between nodes of said subtree.

BRIEF DESCRIPTION OF THE DRAWINGS

Features and advantages of the present invention will become more apparent from the following detailed description of exemplary embodiments thereof taken in conjunction with the accompanying drawings in which.

DESCRIPTION OF EMBODIMENT(S)

Figure 1:
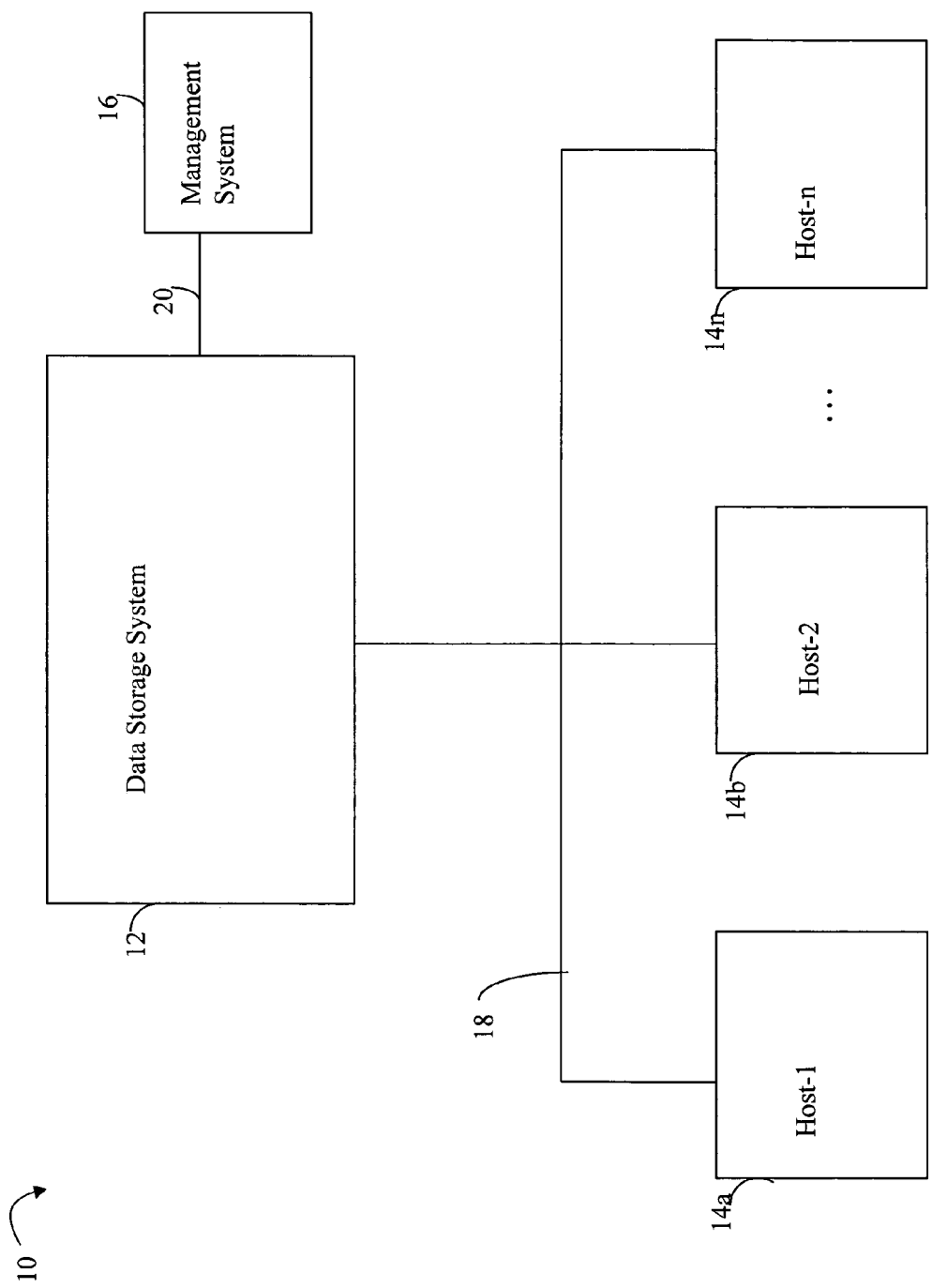
FIG. 1 is an example of an embodiment of a computer system that may utilize the techniques described herein.

Referring now to FIG. 1, shown is an example of an embodiment of a computer system that may be used in connection with performing the techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSCI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSCI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LV s may or may not correspond to the actual disk drives. For example, one or more LV s may reside on a single physical disk drive. Data in a single storage system may be accessed by multiple hosts allowing the hosts to share the data residing therein. An LV or LUN (logical unit number) may be used to refer to one of the foregoing logically defined devices or volumes.

Figure 2:
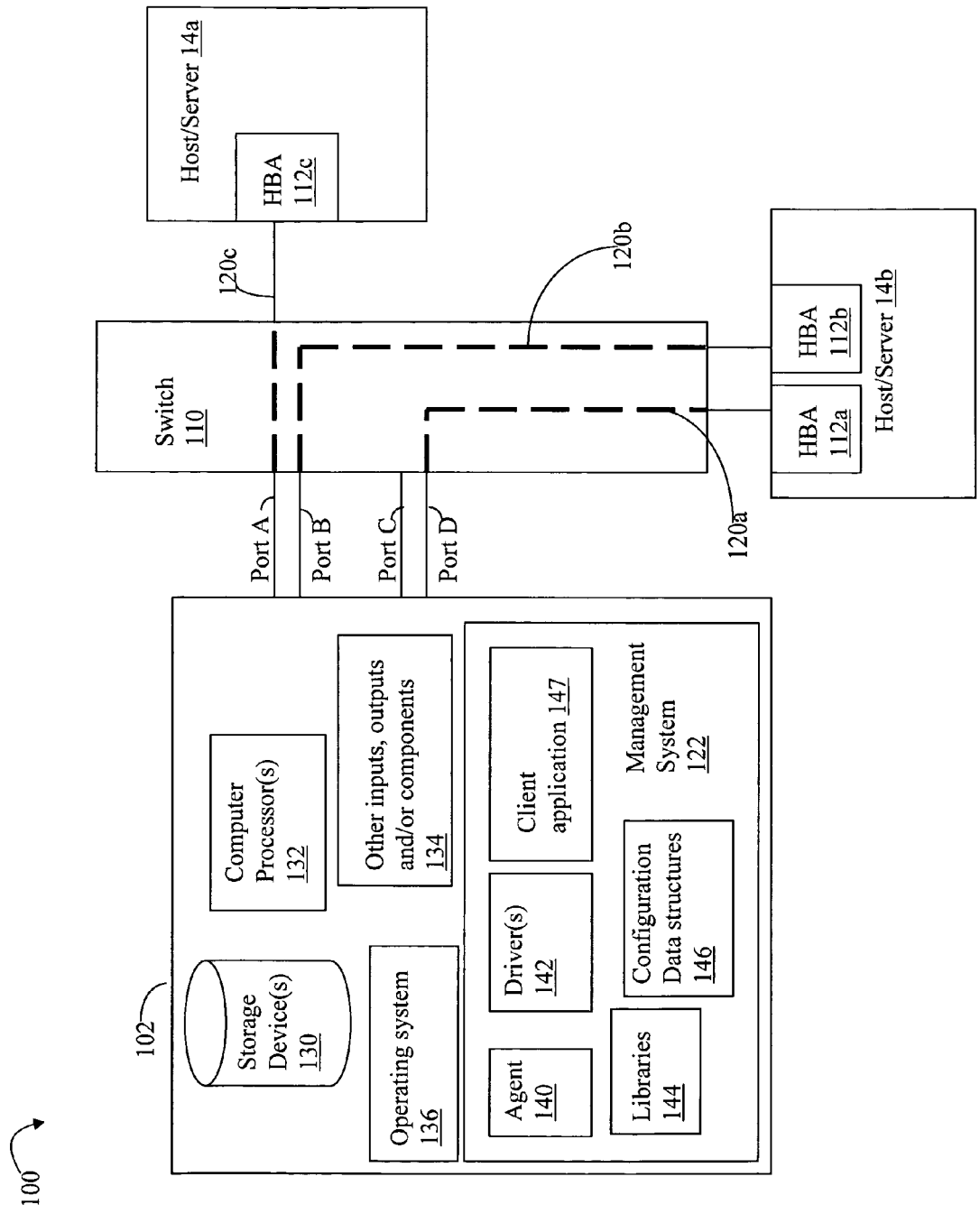
FIG. 2 illustrates in more detail components that may be included in an embodiment of the system of FIG. 1.

Referring now to FIG. 2, shown is an example 100 of components that may be used in connection with techniques described herein. The example 100 may represent components illustrated in connection of FIG. 1 configured in a storage area network (SAN). Included in the example 100 is a data storage system 102, a switch 110, and hosts or servers 14a and 14b. The switch 110 may be used in connection with facilitating communications between each of the hosts 14a and 14b and the data storage system 102. Communications between a host and the data storage system 102 may be defined in terms of a path. Host 14a communicates with the data storage system 102 over a path designated as 120c. Path 120c is formed by the starting point, the HBA or host bus adapter 112c and the ending point, port A of the receiving data storage system 102. Host 14b communicates with the data storage system 102 over two paths designated as 120a and 120b. Path 120a is formed by the starting point, the HBA 112a, and the ending point, port d of the receiving data storage system 102. Path 120b is formed by the starting point, the HBA 112b, and the ending point, port b of the receiving data storage system 102. It should be noted that different HBAs from the same or different hosts may also communicate with the data storage system through a same port of the data storage system although each path 112a, 112b, and 112c use a different port. An embodiment may represent a path using the WWN (world wide name) of a host's HBA and the WWN of a data storage system port receiving the request. As known to those skilled in the art, a WWN is a unique number assigned by a recognized naming authority that identifies a connection or a set of connections to the network. As also known to those skilled in the art, various networking technologies that may be used in an embodiment make use of WWNs. In connection with the techniques described herein, other embodiments may use other ways in defining a path that may vary with the connectivity in each embodiment.

Each HBA may include one or more ports although in the example illustrated, each HBA has only a single port. Additionally, although only a single data storage system is illustrated for purposes of simplicity in illustration, each of the hosts may have connections to more than one data storage system in the SAN. Additionally, each host may be connected to the data storage system 102 using other connections, including direct cabling, than as illustrated in FIG. 2.

The data storage system 102 is illustrated as including one or more storage devices 130, one or more computer processors 132, an operating system 136, an agent 140, one or more drivers 142, one or more libraries 144, other inputs, outputs and/or components 134, and configuration data structures 146.

An example of an embodiment of the data storage system 102 is the CLARiiON™ data storage system by EMC Corporation which includes two computer processors as represented by the element 132 although an embodiment may include a different number of processors for use in connection with the techniques described herein.

The one or more storage devices 130 may represent one or more physical devices, such as disk drives, that may be accessed in logical units (e.g., as LUNs) as described elsewhere herein. The operating system 136 may be any one of a variety of commercially available, proprietary, or other operating system capable of execution by the one or more computer processors 132 in accordance with the particulars of the data storage system 102. In one embodiment, the operating system 136 may be the Windows NT™ operating system by Microsoft Corporation.

The agent 140 may be a software component included as part of management software for management of the data storage system, such as the EMC Navisphere™ Array Agent. In one embodiment, there may be one such agent included in each data storage system. In connection with the techniques described herein, the agent 140 may manage configuration data structures 146 including configuration information for the data storage system 102. The configuration information may include data describing a defined configuration such as the different components as well as data regarding the performance and other aspects of these components. As described elsewhere herein in more detail, the configuration information may include information regarding physical components, logical components, and other general configuration information. The physical component information may include information about physical components in the data storage system, for example, the physical disks, fans, and the like. The logical component information may include information about the logically defined components such as, for example, the LUNs, defined RAID groupings (RGs), storage groups of LUNs (SGs), and the like. Such logical component information may include what storage groups are defined and what LUNs are included in each of the storage groupings. Additionally, performance data regarding, for example, logical and/or physical device usage may be included in the configuration information with the appropriate physical and/or logical devices. Other general configuration information may include, for example, the WWN of the data storage system, the serial number of the data storage system, and the like.

The management system 122 may include one or more components used in connection with management of the data storage system 102. In one embodiment illustrated in FIG. 2, the management system 122 may include an agent 140, one or more drivers 122, configuration data structures 146, and a client application 147. It should be noted that an embodiment of the management system 122 may include other components than as illustrated in FIG. 2 in connection with the techniques described herein.

The agent 140 may receive configuration information from one or more data gathering routines included in a library 144, such as an administrative DLL. The routines included in 144 may be used by other components, such as one or more drivers 142 to communicate with the agent 140. For example, a driver included in the data storage system 102 may obtain performance data and communicate such information to the agent 140 using a routine in the library 144. A driver or other component may communicate information to the agent 140 regarding the particular logically defined components in the system. Such information may include logical device definitions and storage groups as may be defined by a data storage system manager using the management system 16. The foregoing configuration information received by the agent 140 may be used in connection with populating the configuration data structures 146. The foregoing configuration information may be obtained by the agent 140 in response to a request received by the agent 140 from a client application 147. In turn, the agent 140 may issue a request to a library from 144 to obtain updated configuration information from one or more drivers 142. The one or more drivers 142 return the requested configuration information to the library which further forwards the configuration information to the agent 140. The agent 140 may then update the configuration data structures 146 and notify the client application 147 of any changes to the configuration information. The foregoing data flow between components of FIG. 2 is illustrated in more detail in connection with FIG. 3.

The other inputs, outputs, and/or components 134 may represent other hardware and/or software components that may be included in the data storage system 102. The element 134 may also include hardware components such as, for example, memory, other storage areas, and the like. The element 134 may also include other inputs and/or outputs such as command line inputs, configuration options, and the like, as described herein.

As the capabilities of the data storage system 102 expand to support more and more physical devices, LUNs and the like, the amount of configuration information stored and managed by the agent 140 in the configuration data structures 146 also increases. In order to provide for efficient use of the configuration information, described herein are various data structure arrangements and techniques used in connection with the configuration information.

Techniques using the components illustrated in the example 100 are described in more detail in following paragraphs.

Figure 3:
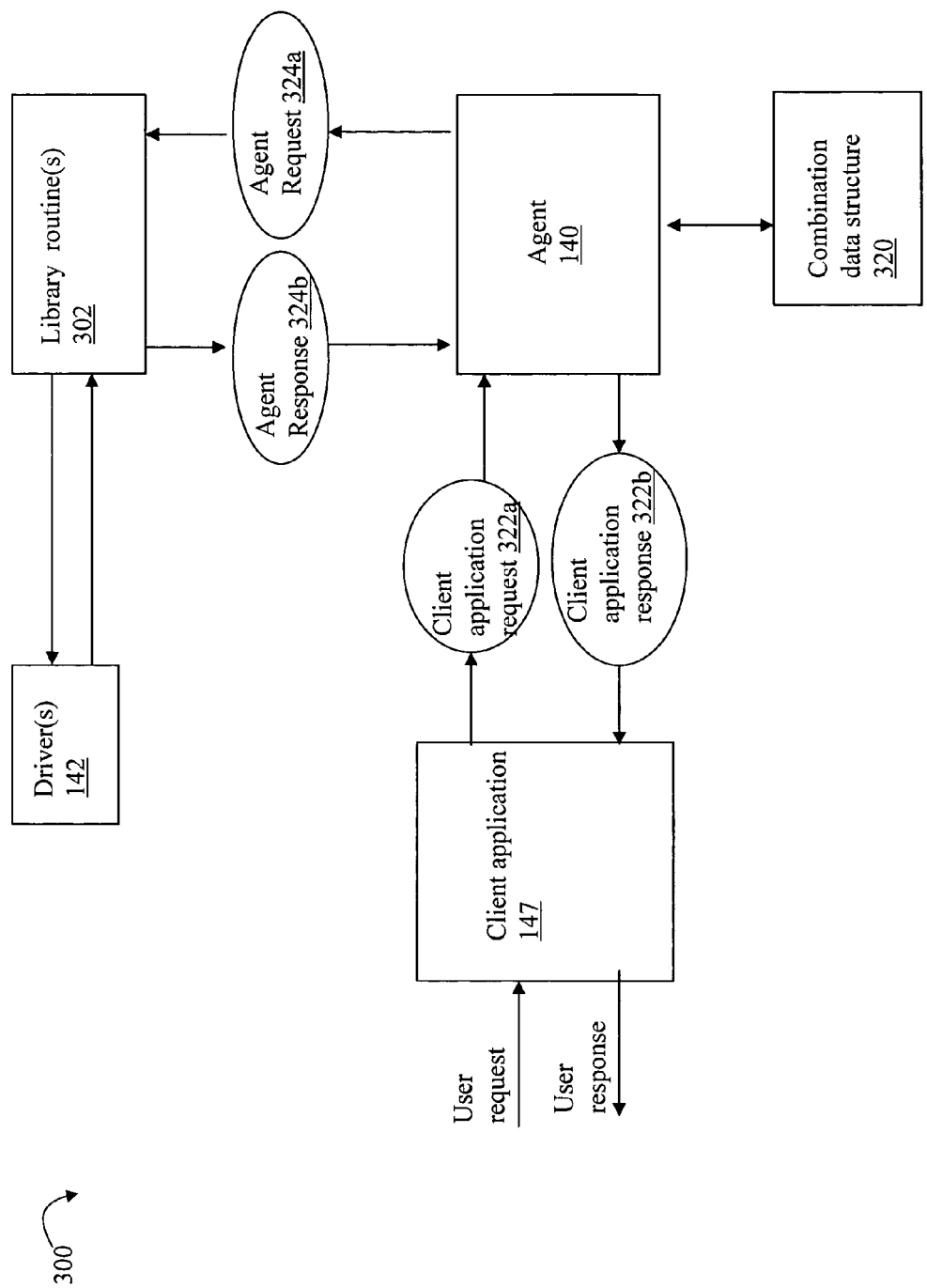
FIG. 3 is an example of a data flow diagram of components included in the embodiment of FIG. 2.

Referring now to FIG. 3, shown is an example illustrating data flow between components included in FIG. 2. The example 300 illustrates the client application 147 receiving a user request to perform a task. In response, the client application 147 may issue a client application request 322a to the agent 140 asking the agent to perform some task in accordance with the user request. The agent 140 processes the incoming client application request 322a and creates an agent request 324a including a first data structure, and sends the agent request 324a to one or more administrative libraries as represented by library routines 302. In one embodiment, the first data structure may be a binary tree in a particular form referred to herein as a tag length data (TLD) format. The TLD tree may specify the requested information. In one embodiment, the request may be to retrieve and/or update configuration information. The TLD tree of the request may indicate the information to be retrieved as well as what information is to be updated. This is described in more detail herein in connection with example TLD trees.

The administrative libraries may utilize IOCTL call(s) to communicate with the appropriate driver(s) 142 to retrieve the requested configuration information and/or update existing configuration information in accordance with the user request. The driver(s) 142 send a response to the appropriate administrative library. The administrative library returns an agent response 324b to the agent 140. The response 324b may also include a TLD tree, for example, if the response includes retrieved configuration information. Otherwise, the response 324b may indicate a status of the agent request 324a. The agent 140 processes the received response 324 and sends a client application response 322b to the client application 147. The response 322b does not include any TLD trees since the client application does not have any knowledge regarding TLD trees. In other words, the TLD tree is a structure understood in this example by the agent and library routines 302. The client application 147 then sends the results of the request processing to the user.

In the foregoing as illustrated in FIG. 3, there are several client/server relationships. The client application 147 is a "server" to the user, and the client application is also a "client" with respect to the agent 140. The agent 140 is a "server" with respect to the client application 147, and is a "client" of the administrative libraries of 302. The administrative libraries 302 may be characterized as "servers" with respect to the agent 140, and are also "clients" of the one or more drivers 142. The drivers 142 are "servers" to the administrative libraries, and are "clients" with respect to the firmware, hardware, and like (e.g., clients with respect to the lower-level components to which the drivers 142 communicate. In this illustrative example, the agent 140 and administrative libraries of 302 are the only two entities included in the example 300 that have knowledge regarding the TLD tree structure. Other embodiments may vary the data formats and structures understood by the components than as described herein for purposes of illustration and example.

In one embodiment, a plurality of different drivers may be used in connection with obtaining different configuration information. For example, a first driver may be used in connection with obtaining performance data about one or more devices. A second driver may be used in connection with obtaining changes to the data storage configuration such as newly defined logical definitions (e.g., newly defined SG, RG, and the like) as may be made by a data storage system manager communicating with the agent from a management system. A third driver may be used in connection with obtaining yet different configuration information. Each driver may use a different administrative library which is able to understand and communicate with the particular driver. Each of the administrative libraries may use a second library to convert or transform the configuration information received from a driver into the first data structure format for the request sent to the agent. In one embodiment, the second library may be a TLD library used to transform the configuration information received from a driver into a TLD binary tree format to be included in a message, such as the agent response 324b, sent to the agent. The use of the one or more administrative libraries in combination with the second library (e.g., the TLD library) may be characterized as a layer of abstraction or a wrapper transforming the configuration information from a first format (e.g., as understood by the drivers) into a second format (e.g., the TLD binary tree as understood by the agent) for inclusion in a message, such as agent response 324b. Similarly, when information in the form of a TLD tree such as may be included in an agent request 324a, is sent by agent 140 to one of the administrative libraries of 302, the foregoing libraries may be used in connection with converting the TLD tree to a form understood by the drivers.

In the embodiment described herein the driver(s) 142 may be used in connection with retrieving configuration information as well as updating configuration information in accordance with a user request. In connection with retrieving configuration information, the TLD tree of an agent request 324a may specify that all or particular portions of configuration information are to be returned via the responses illustrated in 300. In connection with updating configuration information, the TLD tree of the agent request 324a may specify that configuration information which is to be added. In one embodiment, one or more of the drivers may execute in kernel space and may be used in connection with updating configuration information as maintained in the kernel space. Such configuration information may include logical definitions as may be used in connection with defined SGs. A user requet may be, for example, to add a LUN to an SG resulting in a request sent to the appropriate driver to update the configuration maintained in kernel space.

In the embodiment described herein, both the agent 140 and the client application 147 have their own local copies of object databases. Each of the agent and the client application may communicate by transmitting portions of the database between each other in accordance with the user request and servicing the user request. The objects in the databases are based on configuration information derived by the agent 140 from the TLD trees received in the agent response 324b. In one embodiment, a request can be made by the agent 140 to obtain updated configuration information from one or more drivers at predetermined intervals in order to keep the information of the object databases up to date. In one embodiment, a TLD tree may be retrieved by the agent 140 at least once a minute. After a TLD tree as received by the agent 140 in an agent response 324b is used to update the agent's object database, the TLD tree may be discarded. The agent may determine changes made to its own object database. The agent 140 may then forward the changes to the client application 147 when requested by the client application 147 (e.g., as may be performed in response to the client application request 322a of FIG. 3). In accordance with a user request, the client application may also specify that the agent 140 is to refresh or update its object database in response to client application request 322a. Alternatively, in accordance with the user request, the client application request 322a may specify that the agent 140 may service the request with the current content of its object database. If the request specifies the former (e.g., refresh object database), the agent issues an agent request 324a to obtain any updated information in the form of a TLD tree included in an agent response 324b. In connection with the techniques described herein, the agent 140 may use a combination data structure 320 which incorporates the first data structure (e.g., such as the TLD tree) as understood by one or more of the library routines 302 and the agent 140. The combination data structure may be used by the agent 140 in connection with converting configuration information in accordance with the first data structure, such as the TLD binary tree, and a second data structure, such as the objects included in the object database as maintained at the agent 140.

In one embodiment, the libraries, such as the different administrative libraries, may be used to facilitate user-kernel space communications between different components. For example, the drivers may execute in user mode, or in another non-privileged execution mode. The agent may execute in kernel mode or in another non-user or privileged execution mode.

Although use of drivers and library routines are illustrated herein, an embodiment may use other techniques in connection with retrieving and/or updating configuration information. Additional details regarding the first data structure, such as the TLD tree, and the combination data structure 320 are described in following paragraphs.

Figure 4:
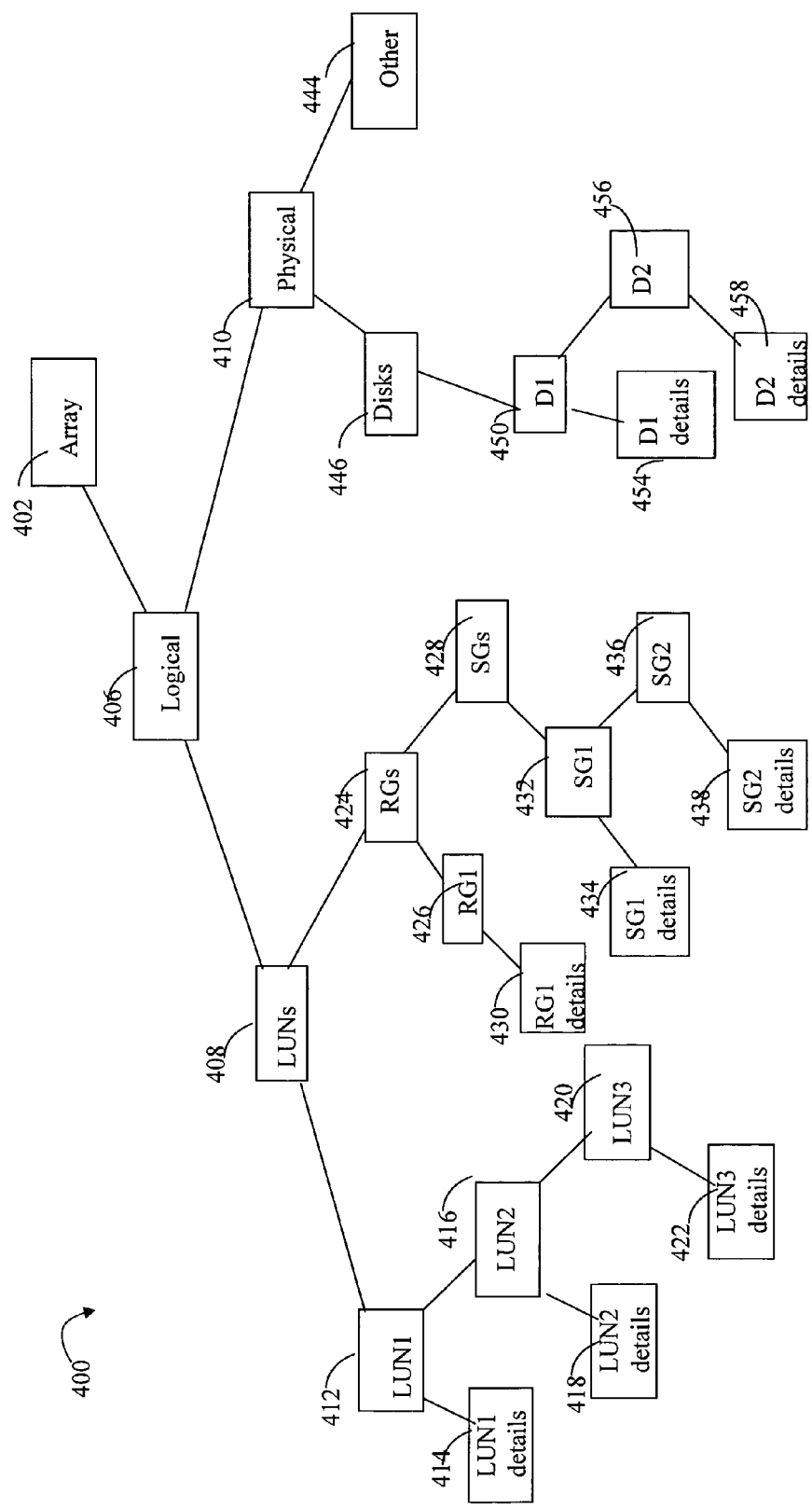
FIG. 4 is an example representation of a first data structure used in connection with the techniques described herein.

Referring now to FIG. 4, shown is an example representation of a first data structure that may be used in an embodiment in connection with the techniques described herein. In this example 400, the data structure illustrated may be characterized as a TLD binary tree. Information received by the agent 140 included in an incoming request, for example, to update or store configuration information, may be in the form of a TLD binary tree in accordance with a defined hierarchical structure. As will be appreciated by those skilled in the art, configuration information may be in other forms for use with the techniques described herein. As also known in the art, a binary tree is characterized as a tree in which each parent node has at most 2 children. The TLD form refers to a particular format of data for each node that is described in more detail elsewhere herein.

As will be appreciated by those skilled in the art, a variety of different techniques may be used in connection with implementation of a binary tree representation. For example, an embodiment may define a node to include a data portion and two pointer fields for pointing to the right and left child nodes.

The configuration information for a data storage system may be represented hierarchically. In one embodiment, the configuration information may be represented and stored using an object oriented design. Within the hierarchy are logical, physical and other general configuration objects corresponding to the general descriptions or categories as set forth in more detail elsewhere herein. Objects which are at a same level in the hierarchy may be referred to as peer objects having a peer level relationship therebetween. Objects which are beneath or embedded under a same parent may be referred to as embedded objects having an embedded relationship therebetween. In the embodiment described in 400, objects at a same peer level are stored as right children of one another. Objects having an embedded relationship to its parent are represented and stored as a subtree formed with the left child node as the subtree root.

With reference to the example 400, the root node of the tree and hierarchy is the array node 402 corresponding to the data storage system represented by the configuration data structure. Objects which are embedded or hierarchically beneath the array node are included in the subtree formed with 406 as the root. Objects 406, 410 and 444 are at a same peer level in the hierarchy. Logical configuration data as represented by the node 406 and all that is hierarchically beneath or embedded with respect thereto may include LUNs, RAID groupings (RGs) and storage groupings of LUNs (SGs). In the example 400, LUNs 408, RGs 424 and SGs 428 are all at the same peer level in the hierarchy. Each of 408, 424 and 428 represents a collective data container or lists for the one or more elements included therein. Each LUN defined, such as LUN1 412, LUN2 416 and LUN3 420, are at a same peer level and also embedded beneath the LUNs 408. Similarly, each defined RG 426 is embedded beneath 424, and SG1 432 and SG2 436 are embedded beneath 428. Physical configuration information 410 may include information about one or more physical disks 446. In this example, there are two disks, D1 and D2, as represented by nodes 450 and 456 respectively. The other general configuration information, as represented by node 444 and its descendant nodes, has been omitted for illustrative purposes. Also, for illustrative purposes, detail nodes 414, 418, 422, 430, 434, 438, 454 and 458 represent one or more other nodes corresponding to objects in a defined hierarchy including further details about each device or group of its respective parent object. Examples of what may be included in some of these detail nodes are described in following paragraphs.

The foregoing is illustrative and represents a portion of configuration information that may be included in a defined hierarchy. It should also be noted that an embodiment may use a variation of the conventions and techniques described herein to store and represent the hierarchy in accordance with a particular data structure such as a binary tree. For example, an embodiment may use different conventions to represent nodes at a same peer level in a particular data structure.

In connection with a request to update or store configuration information, the TLD binary tree included in the incoming request may include a subset of information of the example 400, such as the nodes and branches for the particular information being specified. For example, if only logical configuration information is specified in connection with a user request, the input TLD binary tree does not need to include a physical node 410, other configuration information node 444, and their descendant nodes. If the request is to retrieve configuration information, the TLD tree may include a partial tree which is to be filled in as a result of the request.

For example with reference to FIG. 4, if retrieving information regarding a LUN 1, the TLD tree of the agent request 324a may include nodes 402, 406, 408 and 412. The agent response 324b may include any descendant nodes of LUN1 412 added to the TLD tree of the response 324b. If request 324a is to retrieve a complete snapshot of configuration information for the entire data storage system, for example, as in connection with a polling operation described elsewhere herein, the request 324a may include only the node 402. The corresponding response 324b may include the entire TLD filled in with configuration information for the data storage system. If request 324a specifies updates to configuration information, such as a user request to modify or add to existing configuration information, the corresponding request 324a may include a partial TLD tree with those nodes and branches including the update information. In the latter case, the request 324a may omit other portions of the TLD tree not needed to express the update information. In one embodiment, when the library routines 302 return a TLD tree to the agent 140, the routine of 302 may return a pointer to a TLD tree.

Figure 5:
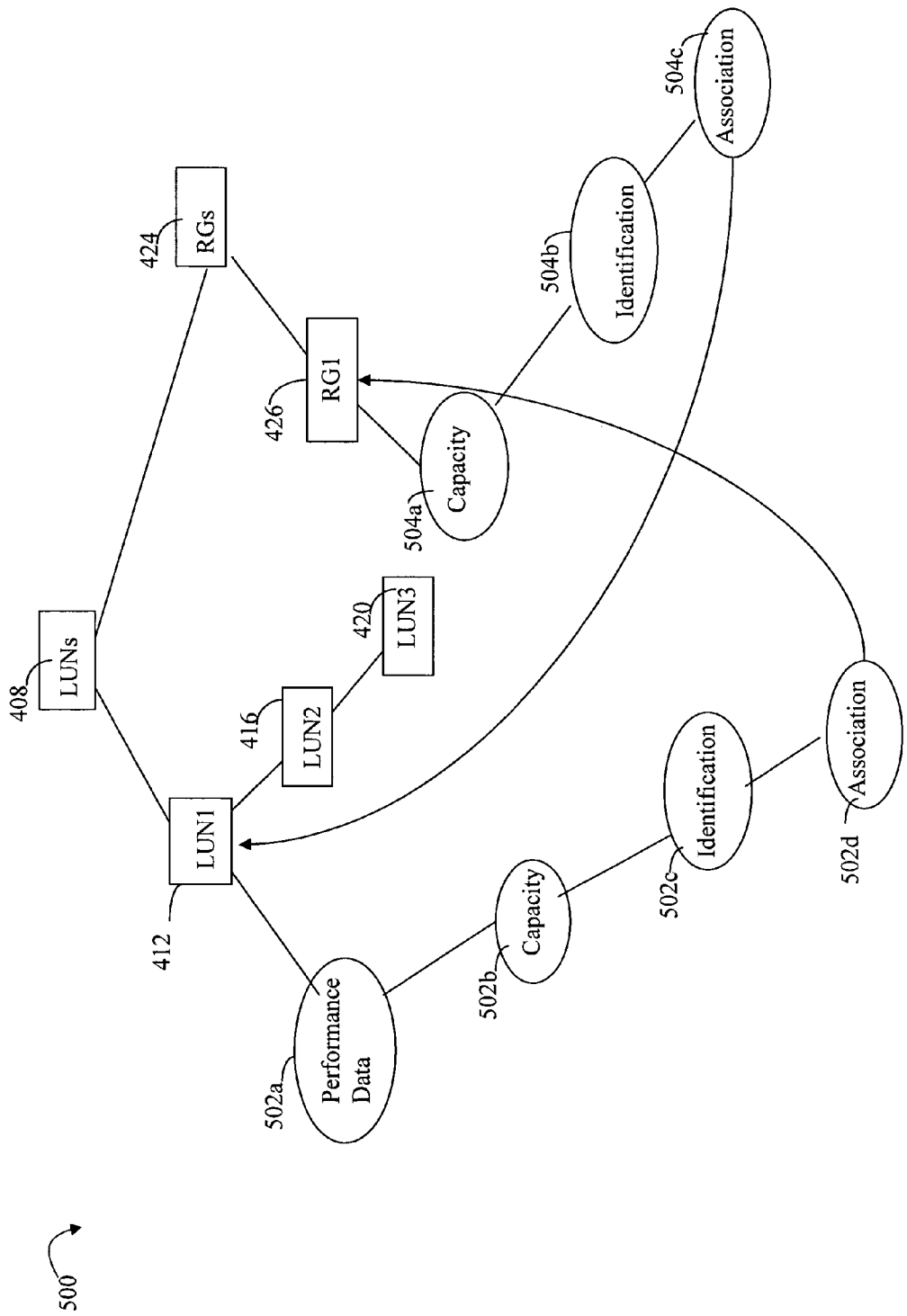
FIG. 5 is a more detail example of a portion of the first data structure.

Referring now to FIG. 5, shown is an example 500 illustrating additional detail regarding configuration information that may be included for a particular LUN and an RG. The example 500 provides additional detail regarding LUN details and RG details as may be included in an embodiment and represented by nodes 414 and 430 in FIG. 4. It should be noted that for purposes of illustration, only details of LUN1 412 are specified although similar information may also be included for details of LUN2 416 and LUN3 420. Embedded beneath LUN1 412 is configuration information represented by 502a, 502b, 502c and 502d, all of which are nodes at a same peer level. Embedded beneath RG1 426 is configuration information represented by 504a, 504b and 504c, all of which are also at a same peer level.

In connection with LUN1 412, performance data 502a may include performance information about LUN1 such as, for example, the number of blocks read and/or written, the number of read and/or write requests, and the like. Capacity 502b may include, for example, the amount of physical storage associated with LUN 1, the amount of storage used, and the like. Identification 502c may include identification information for this particular LUN, such as the LUN number. Association 502d and 504c may be used to represent an association via a link or pointer to another node in the tree. In this example, associations may be used to represent membership in a defined logical grouping, such as an RG or an SG. An association may also be used to represent one component belonging to another such as, for example, physical components, such as a fan, power supply, and the like, which are all associated with the same physical disk drive.

Figure 6:
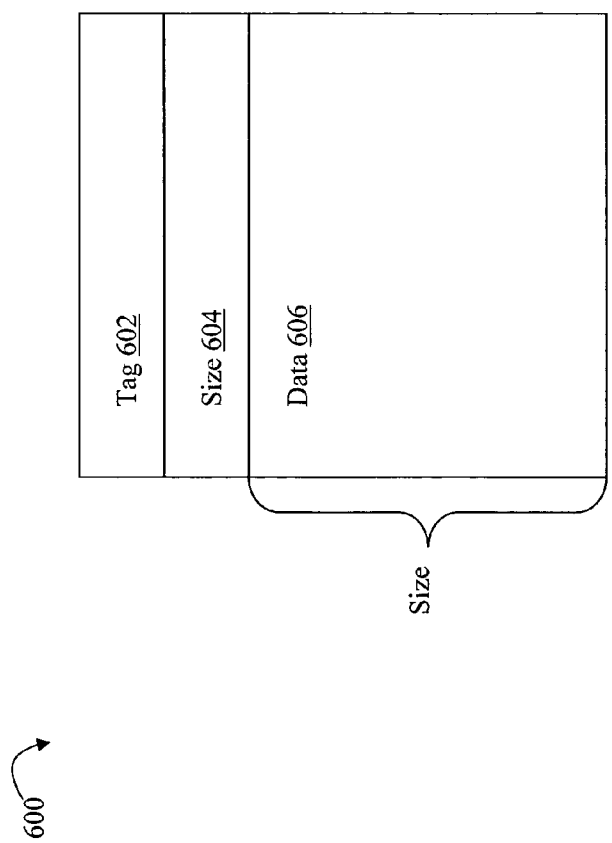
FIG. 6 is an example of an embodiment of fields included a node in the first data structure.

Referring now to FIG. 6, shown is an example representation 600 of a data format for a node in the TLD binary tree as illustrated in connection with FIGS. 4 and 5. The example 600 includes a tag field 602, a size field 604 and a data field 606. The tag 602 may include one a plurality of defined tag values describing what the data portion 606 of the node represents. The tag 602 may be used to identify the type of configuration information represented in the structure by a node and those related nodes embedded beneath the node. There may be a unique tag value defined for each type of configuration information that may be represented by a node for a given hierarchy. For example, an embodiment may define an enumerated type which includes a unique tag value for LUN node such as node 412. Each of nodes 412, 416 and 420 may have the same tag value. A unique tag value may be defined for nodes representing physical disks, such as node 450. Each of nodes 450 and 456 may have the same tag value as node 450 since the data included in each of the nodes represents a physical disk. The size field 604 specifies the size of the data field 606. Thus, each node may be of a variable size in accordance with the particular node and information described therein.

In connection with the techniques described herein, the configuration information as stored and utilized by the agent may be in a configuration data structure characterized as a hybrid or combination data structure 320 of FIG. 3. The combination data structure 320 may be a combination of a first data structure representing the relationships between nodes, such as the TLD binary tree, and a second data structure, which does not represent relationships between elements or nodes therein but generally provides for quicker access times than the first data structure.

What will now be described is an example representation of the second data structure.

Figure 7:
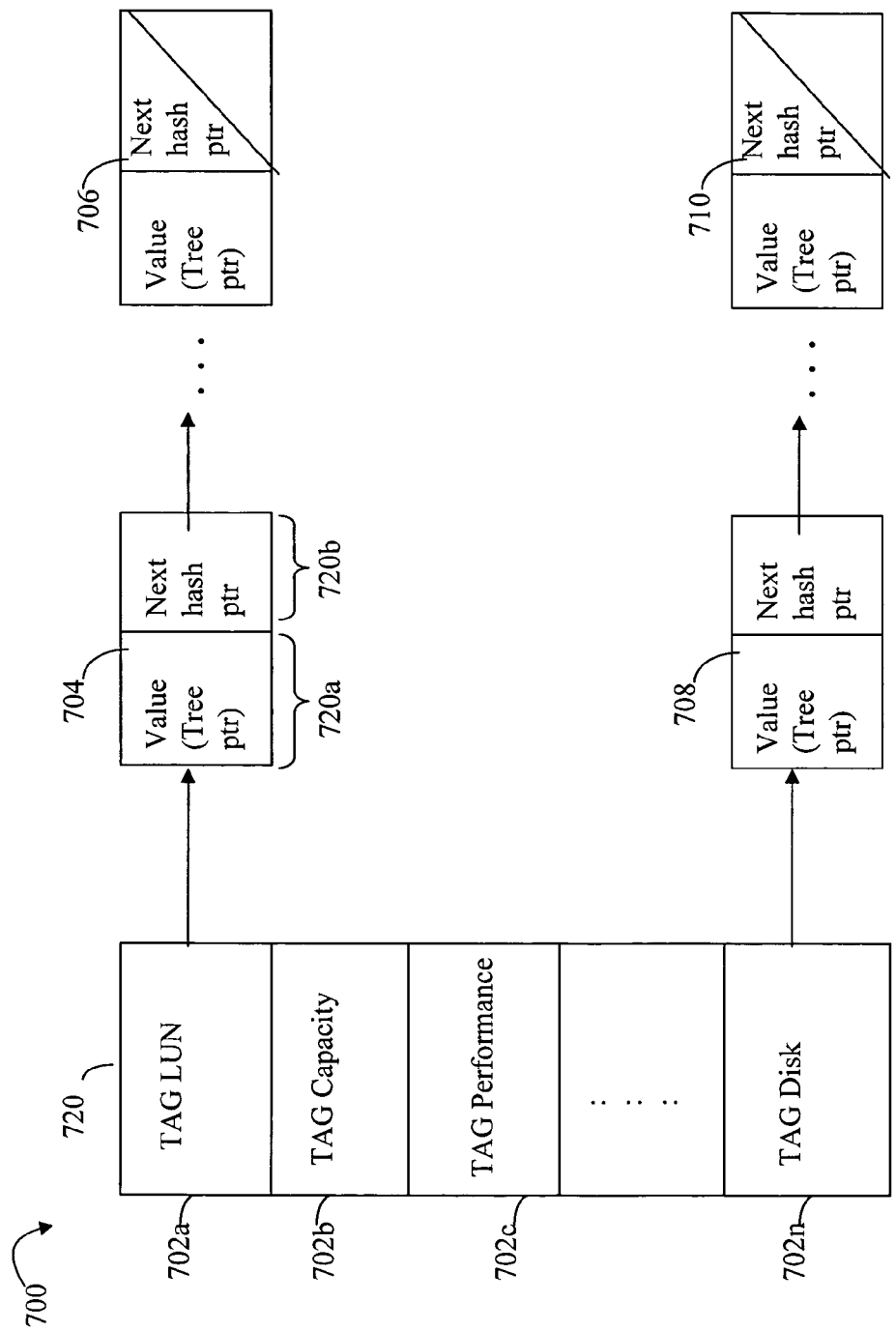
FIG. 7 is an example representation of a second data structure used in connection with the techniques described herein.

Referring now to FIG. 7, shown is an example representation of a second data structure used in connection with the techniques described herein. The second data structure in the example 700 is a hash table. In connection with the techniques described herein, each node in the first data structure, such as the TLD binary tree, is hashed to a hash value using the tag value of the node as the hash key. For hash collisions which occur when multiple nodes hash to the same hash value or element in the hash table, the colliding nodes are included in another data structure associated with the particular hash value. In the example 700, the hash table may include 720, an array or linked list of data elements 702a through 702n. Each data element in 720 corresponds to a head of a list of nodes having a tag value which hashes to the hash value corresponding to the data element. In one embodiment, the hash value of a data element in 720 may correspond to the index or position of the data element in 720. For example, if 720 represents an array indexed from 1 through n, 1 corresponds the hash value represented by 702a and n corresponds to the hash value represented by 702n. In the event that the tag values do not directly correspond to the range 1 through n, than a hash function may be used to map the range of tag values to a hash value in the range of 1 through n.

In the example 700, nodes which collide with other nodes by hashing to a same hash value may be stored in a data structure, such as a singly or doubly linked list. The example 700 illustrates a singly linked list in which each element of the list corresponds to a node from the first data structure. For example, element 702a represents the list of nodes from the first data structure having a tag value of TAG LUN (e.g., 412, 416, and 420). It should be noted that in this example, the range of hash values may map directly to the range of tag values. In other words, the dimension of the hash table structure 720 may be selected so that each tag value maps to a unique hash value and each singly linked list only includes nodes having a same single tag value. An embodiment may select the dimension of the hash table structure 720 to be of a different size. For example, for a range of integer tag values from 1 through m, inclusively, m being even, the size of the structure 720 may be selected as m/2 so that two different tag values map to each hash value. Thus, each single linked list includes nodes having at most two different tag values.

Each element in the singly linked list associated with a particular hash value includes two portions. For example, element 704 includes a first portion 720a representing the data value and a second portion 720b pointing to a next element in the singly linked list, if any. Similarly, the tag value for a node in the first data structure corresponding to a disk (e.g., 450) has a tag value of TAG Disk and a corresponding hash value of n. In this example, all nodes representing a physical disk are included in the singly linked list associated with data element 702n.

It should be noted that other elements have been omitted from the example 700 for purposes of illustration. Null pointers are represented by having a diagonal line through the pointer field, for example, as in 706 and 710 illustrating the last data elements in the linked lists associated with hash values of the hash table.

Figure 7A:
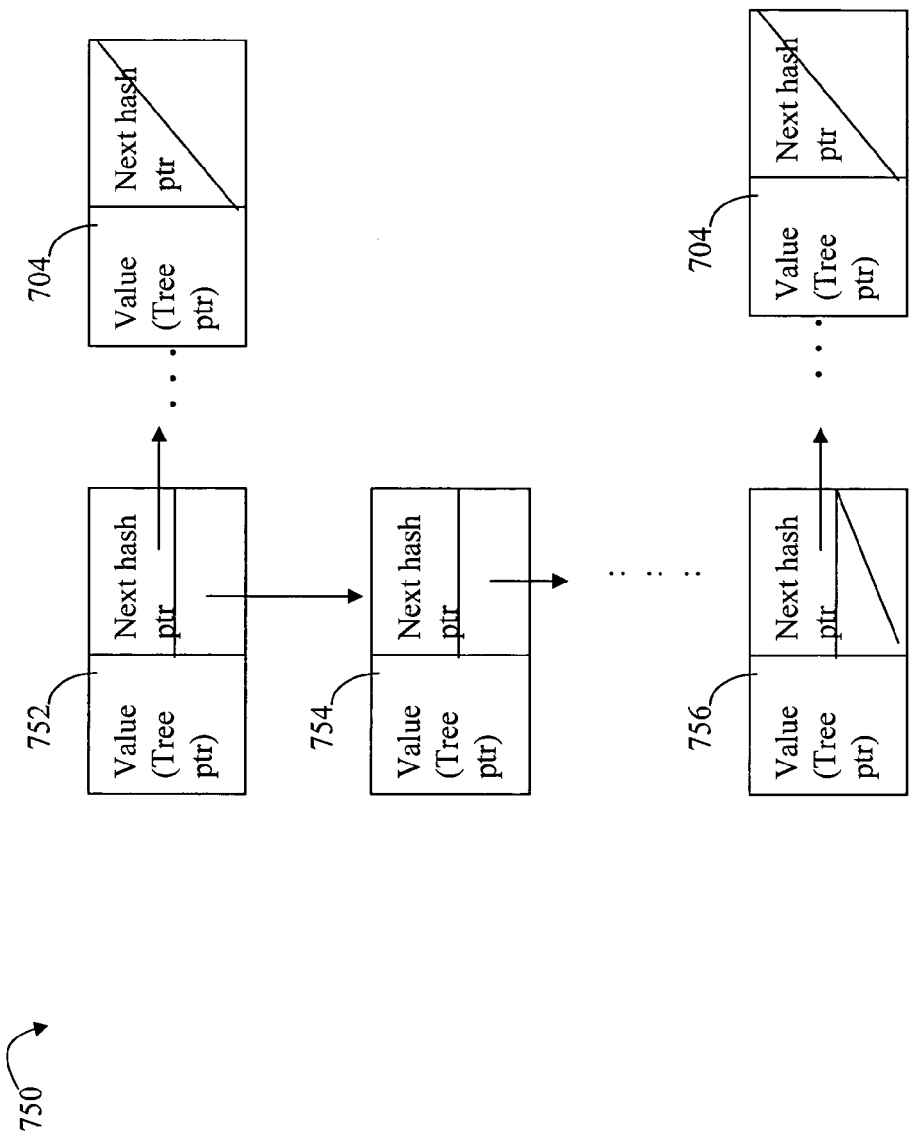
FIG. 7A is another example representation of a second data structure that may be used in connection with techniques described herein.

Referring now to FIG. 7A, shown is another example representation of a hash table that may be used in connection with techniques described herein. In the example arrangement of 750, the first node which hashes to a particular hash value is included as the first element in the list and also the head element. The foregoing is in contrast to the arrangement in the example 700 of FIG. 7 in which the head of each list of nodes (e.g., see element 720) may be characterized as a "dummy" element and does not correspond to a node in the TLD binary tree (e.g., see element 720). Also, the arrangement 750 uses a linked list to connect elements 752, 754 and 756 which are the head elements of each list of nodes for the different hash values.

Although the hash value is formed using a tag value as described herein for each node, a hash value may be formed using other information associated with each node in place of, or in addition to, using the tag value.

As will be appreciated by those skilled in the art, other variations of a hash table arrangement and hash collision resolution may be used in connection with the techniques described herein.

Figure 8:
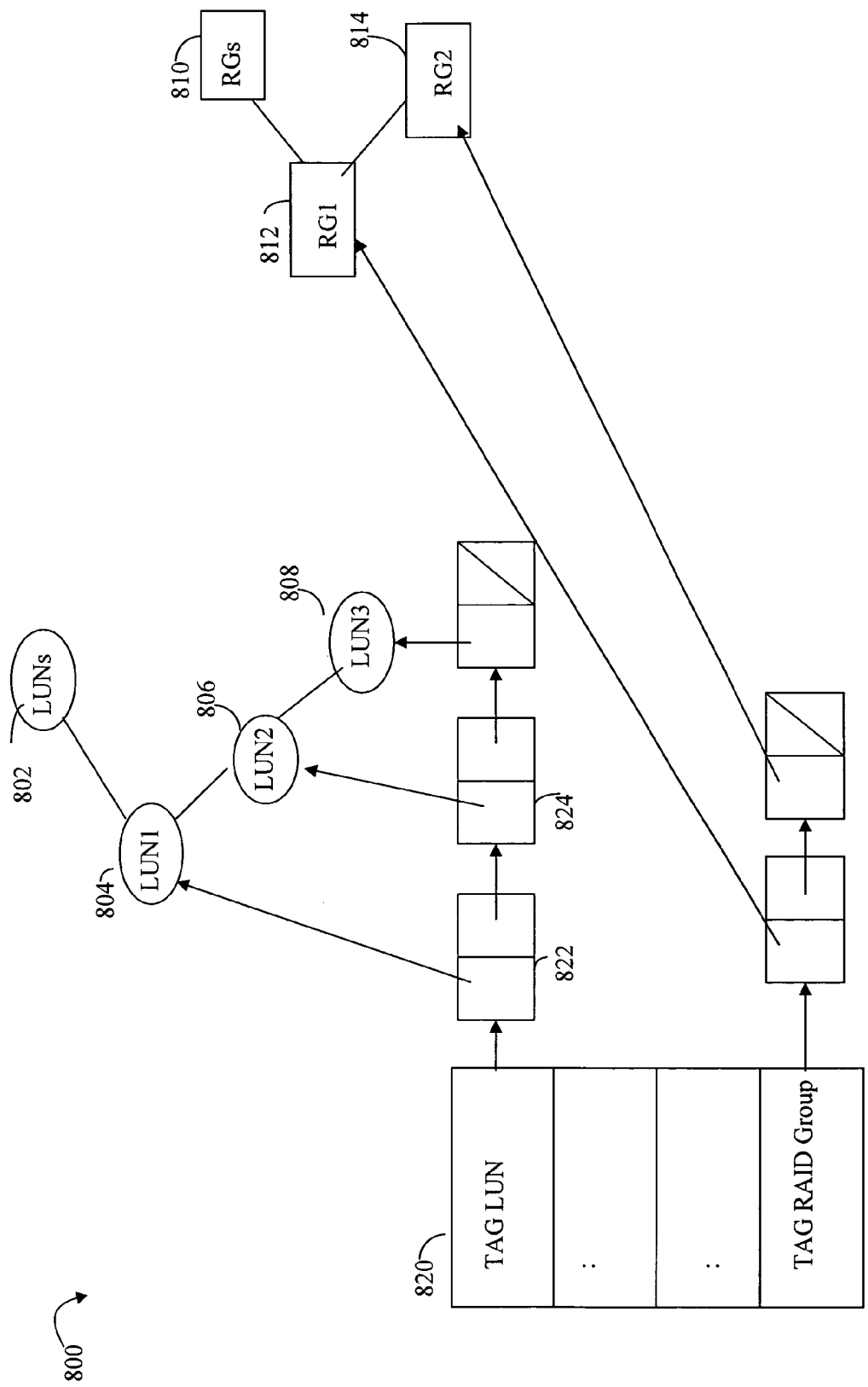
FIG. 8 is an example of an embodiment of combination data structure utilizing the first and second data structures.

Referring now to FIG. 8, shown is an example representation 800 of an embodiment of the combination data structure that may be used in connection with the techniques described herein. The combination data structure 800 is a combination of the first data structure, the TLD binary tree, and the second data structure, the hash table, as described elsewhere herein.

The example 800 includes the particular data structures illustrated in connection with FIGS. 4 and 7. It should be noted that the example 800 illustrates portions of nodes that may be included in a TLD binary tree rather than a complete TLD binary tree. The example 800 includes subtrees with root nodes 802 and 810 and illustrates how these nodes may be integrated in a combination data structure using the TLD binary tree and the hash table. The combination data structure may utilize variations of the first and second data structures as set forth herein and also known to those skilled in the art. For example, the combination data structure may utilize the representation of the hash table of FIG. 7A rather than the arrangement of FIG. 7.

A hash table included in the combination data structure may include data elements having a value portion 720a and a next node portion 720b as illustrated in FIGS. 7 and 8. In the foregoing, the value portion 720a is a pointer to the node in the first data structure, the TLD binary tree. Alternatively, the hash table may include data elements in which the value portion 720a is the data or actual node of the first data structure rather than a pointer to the node. This is illustrated in connection with FIGS. 9 and 10.

Figure 9:
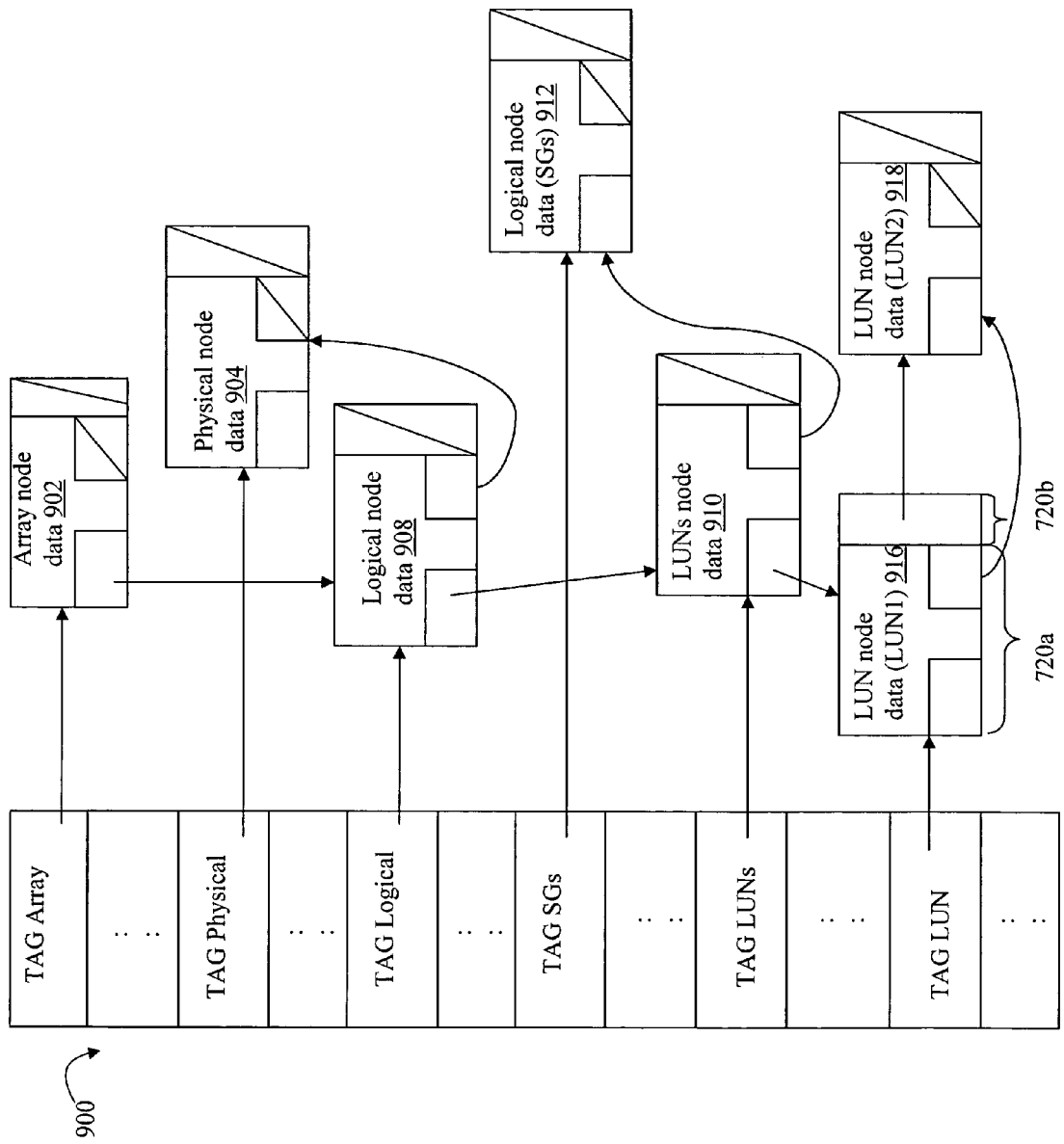
FIG. 9 is another example of an embodiment of a combination data structure utilizing the first and second data structures.

Referring now to FIG. 9, shown is another representation of a combination data structure that may be used in connection with the techniques described herein. The example 900 includes a hash table in which the value portion 720a of a data element of the linked lists includes the data or actual node of the first data structure, the TLD binary tree, rather than a pointer to the node in the first data structure.

Figure 10:
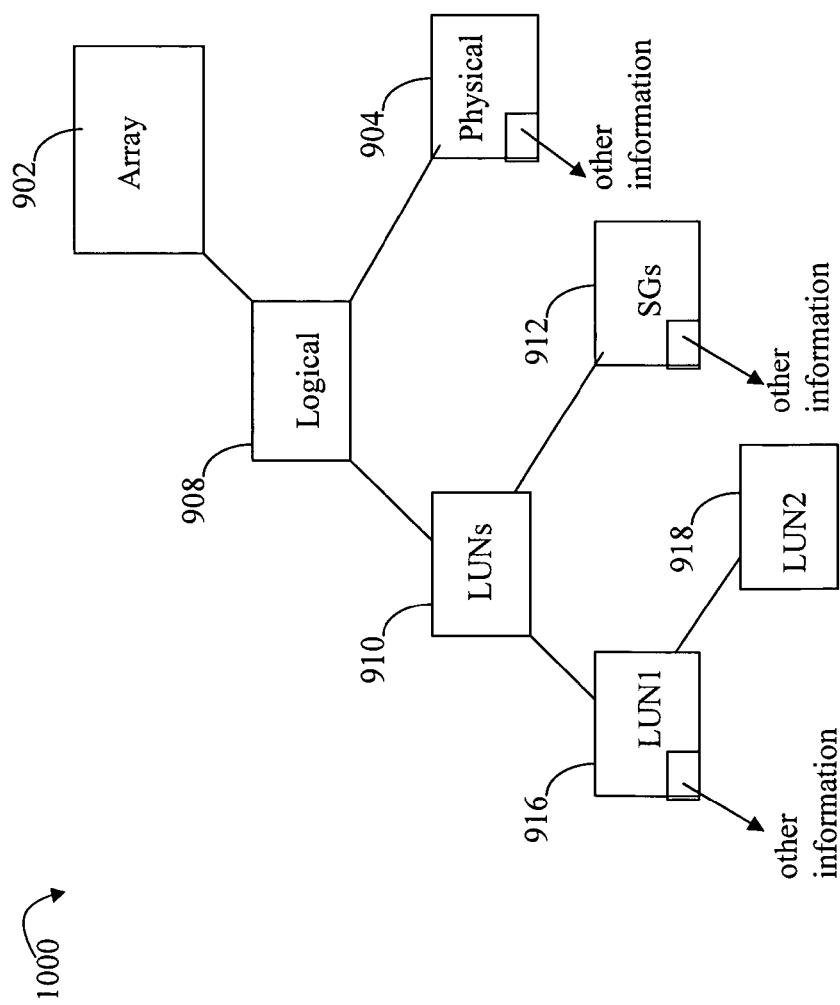
FIG. 10 is an example of a binary tree as included in the combination data structure illustrated in FIG. 9.

FIG. 10 represents an example of a TLD binary tree as included in the combination data structure illustrated in 900 of FIG. 9. It should be noted that in this example, nodes 904, 912, and 916 may include a pointer to other nodes representing objects having an embedded relation thereto.

Figure 11:
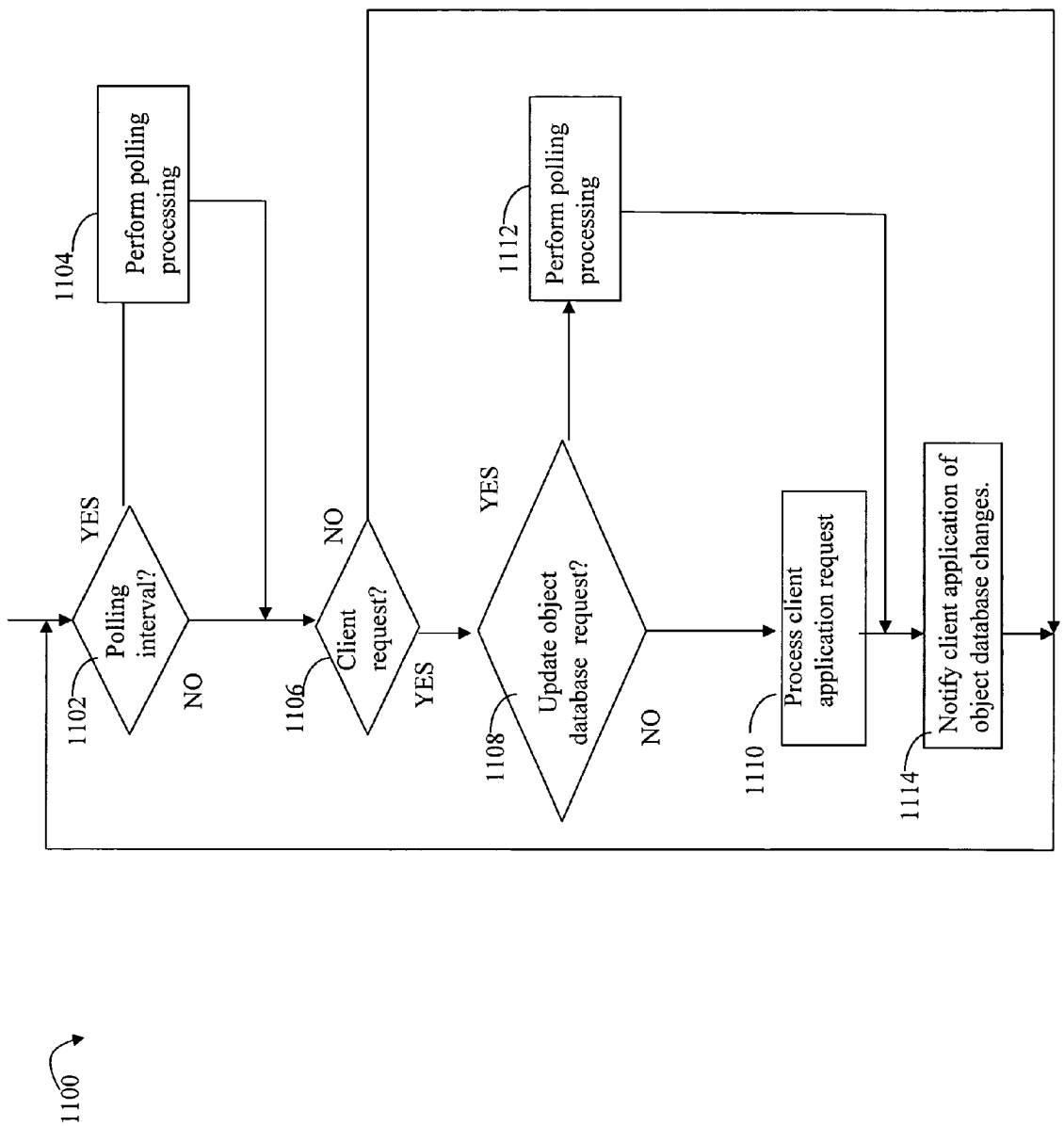
FIG. 11 is a flowchart of processing steps that may be performed in an embodiment using the techniques described herein.

Referring now to FIG. 11, shown is a flowchart of steps that may be performed in an embodiment in connection with the techniques described herein. The steps of flowchart 1100 generally summarize processing described herein as may be performed by the agent 140. The steps of flowchart 1100 in the embodiment described herein may be performed by the agent 140 continuously as long as the agent is running. At step 1102, a determination is made as to whether the next polling interval has elapsed. If so, control proceeds to step 1104 to perform polling processing in connection with retrieving the updated configuration information from the drivers. Step 1104 may include the agent communicating with the library routines which, in turn communicate with the drivers to obtain the updated configuration information. Step 1104 is described in more detail in connection with FIG. 12. From step 1104, control proceeds to 1106. If step 1104 evaluates to no, control proceeds directly to step 1106. At step 1106, a determination is made as to whether a client application request has been received. If not, control proceeds back to step 1102 to wait for the next polling interval to elapse. If step 1106 evaluates to yes, control proceeds to step 1108 where a determination is made as to whether the client application request is a request to update the object database. If so, control proceeds to step 1112 to perform polling processing. Step 1112 processing is similar to that as described in connection with step 1104. From step 1112, control proceeds to step 1114 where the client application is notified of any object database changes in the form of the client application response 322b. As described elsewhere herein, the client application may request notification of changes with respect to a specified date and/or time as indicated by a timestamp value. From step 1114, control proceeds to step 1102.

If step 1108 evaluates to no, control proceeds to step 1110 to process the client application request. In the embodiment described herein, a request 322a in accordance with a user request may be to update the configuration information and/or retrieve configuration information. A request to update configuration information may result in updates to the object database as maintained by the agent 140 and client application 147 as well as other data structures such as the kernel data structures of configuration information as may be maintained by one or more of the drivers 142. From step 1110, control proceeds to step 1114 and then returns to step 1102.

Figure 12:
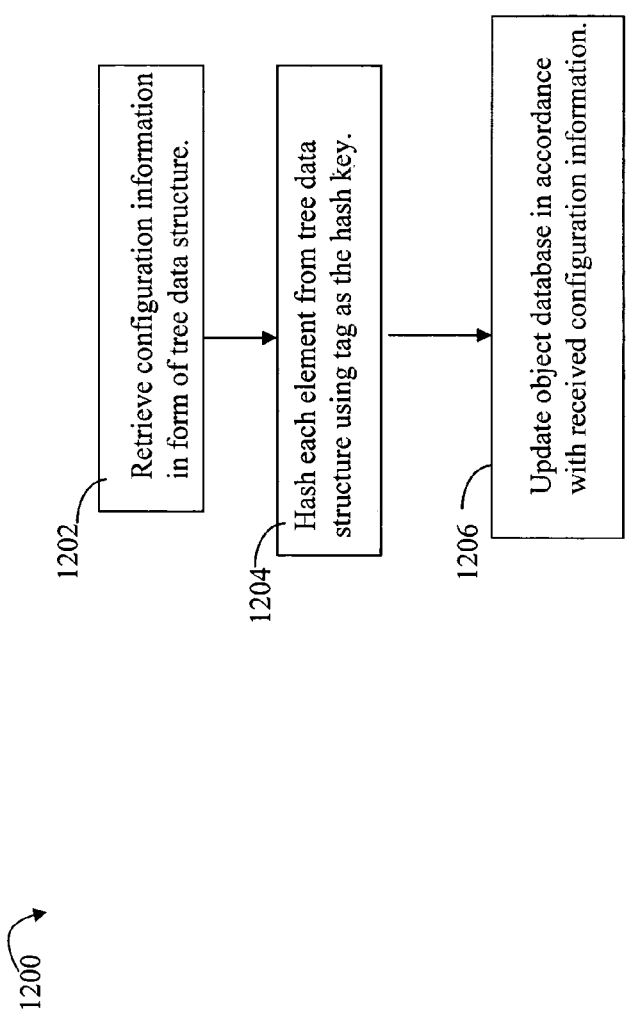
FIG. 12 is a flowchart of processing steps that may be performed in an embodiment in connection with performing polling processing using the techniques described herein.

Referring now to FIG. 12, shown is a flowchart 1200 of processing steps that may be performed in connection with performing polling processing. The steps of flowchart 1200 set forth additional detail of processing as may be performed in an embodiment in connection with steps 1104 and 1112 of FIG. 11. At step 1202, the configuration information is retrieved in the form of the tree data structure, such as the TLD binary tree data structure described herein. Step 1202 may include, for example, communicating with the libraries and drivers and obtaining return response information therefrom by the agent. The first data structure, the TLD binary tree, included in the combination data structure may be populated at step 1202 using the received configuration information. At step 1204, the agent hashes each element from the TLD binary tree using the tag value as the hash key. The second data structure, the hash table, included in the combination data structure may be populated as part of step 1204 once the hash values have been determined. It should be noted that prior to performing step 1204, any initialization processing of the hash table has been performed. From step 1204, control proceeds to step 1206 where processing is performed to update the object database in accordance with the received configuration information reflecting the updated or new configuration information since polling was last performed. As part of step 1206 processing, object instances may be created and initialized using information extracted from the combination data structure using the hash table and/or the TLD binary tree.

In one embodiment, each object in the object database as maintained by the agent 140 may have a timestamp indicating the time at which the configuration information of the object was obtained. In other words, the object reflects the configuration information at a point in time as indicated by the object's corresponding timestamp. When new configuration information is retrieved, as with the polling process described elsewhere herein, objects for use in the object database of the agent 140 may be created in accordance with this new configuration information and assigned a new timestamp. New objects in accordance with the updated configuration information may be compared to those in the object database. If there has been a change to a particular object, the object database may be updated with the new object and its associated timestamp. In connection with a client application request 322a to retrieve updated configuration information, the request 322a may specify a particular timestamp. The agent 140 may return information to the client application in a response 322b in accordance with the objects from the agent's object database having a later corresponding timestamp than as specified in the request 322a.

In one embodiment, when the agent 140 retrieves updated configuration information, the agent 140 may perform the processing of FIG. 12 and extract configuration information from the combination data structure as needed in connection with creation of new objects which may be added to the object database of the agent 140. In other words, the agent constructs a second object database structure in accordance with the new configuration information by extracting information from the combination data structure. As described herein, the retrieval techniques used by the agent 140a may be the retrieval techniques using the first data structure and/or second data structure. The particular ordering and operations performed may vary in accordance with the configuration information being retrieved as well as the input parameters available in connection with performing the retrieval operation. For example, in connection with creating an object for the second object database structure, the agent 140 may need information about particular LUNs. However, if the agent 140 only has as available input the root node of the TLD tree, the agent 140 may utilize the tree structure to traverse the tree to the appropriate hierarchical level and obtain the needed information. Alternatively, the agent 140 may have the particular LUN tag and may more efficiently obtain the necessary information using the second data structure, such as the hash table. Once the second object database structure is constructed, the agent may compare the second object database structure with objects as stored in the existing or current object database to determine any differences and accordingly update the current object database. In this embodiment, once the object database of the agent has been updated with this new configuration information, the combination data structure may be discarded and rebuilt each time new configuration information is retrieved. In summary in the embodiment just described, the agent maintains a current object database, constructs a combination data structure with each new set of configuration information, constructs a second object database structure in accordance with the combination data structure, and updates the current object database by comparing objects of the current object database with objects of the second object database structure.

The current object database may be accordingly updated with any changes. Comparison may be made, for example, by comparing timestamps of corresponding objects of the existing database and second database structures. New nodes may be added to, or removed from, the current object database. Also, any updates to existing objects may be made to the current object database. An embodiment may use any one or more different techniques in connection with determining the differences in order to update the current object database.

In an alternative embodiment, the agent 140 may maintain a current combination data structure associated with configuration information from a first point in time. This current combination data structure may reflect the configuration information as maintained in a current object database of the agent 140. The agent 140 may obtain updated configuration information and construct a second combination data structure. Using the techniques described in U.S. patent application Ser. No. 11/325,494, filed Jan. 3, 2006, entitled "Techniques for Managing State Changes of a Data Storage System Utilizing the Object Oriented Paradigm", which is incorporated by reference herein, the differences between the current and second combination data structures may be determined in two phases and recorded as structural changes (e.g., removals and additions to the combination data structure) and changes to the data of objects of the combination data structure. The differences may be used in connection with updating the current object database as maintained by the agent. After the object database of the agent has been updated, the second combination data structure may become the current combination data structure reflecting the configuration information as included in the agent's object database.

It should be noted that the particular operations, such as for retrieval (e.g., read) and/or update (e.g., write), performed using the combination data structure may vary in accordance with how the combination data structure is used in an embodiment.

The foregoing hybrid or combination data structure leverages the strengths of more than one data structure for use in connection with configuration information although the combination data structure may be used in connection with other types of data. As described herein, one strength of the binary tree data structure is that it can express relationships between nodes and represent a defined hierarchical arrangement. One strength of a hash table data structure is that an element can be stored or retrieved very quickly (e.g., in constant time, computationally speaking). The combination data structure provides for maintaining the data and the relationships of the nodes of the binary tree while also allowing for a reduction in time to access information stored therein using the hash table. The benefits of reduced access time are more readily apparent and significant as the number of nodes in the tree increases. Using the combination data structure, the same data may be accessed using a first set of techniques for the first data structure as well as a second set of techniques for the second data structure. Additionally, the relationship information expressed using the first data structure is also maintained and may be used in connection with servicing requests.

Although examples of the first data structure and second data structure used herein are, respectively, a TLD binary tree and a hash table, different data structures and variations of the ones described herein may also be used in connection with the techniques described herein. For example, the first data structure may be a particular type of binary tree such as a balanced binary tree. The first data structure may also be an n-ary tree in which each parent node has no more than "n" children. The second data structure may be a hash table using any one of a variety of different hash collision techniques. For example, described herein is the use of a linked list of the one or more elements that resolve to the same hash value (e.g., have a hash collision). An embodiment may also use other hash collision resolution techniques including, for example, rehashing to a second hash value in accordance with a defined hash function.

An embodiment of the agent may use one or both of the data structures included in the combination data structure in connection with storing and/or retrieving configuration information. For example, in connection with servicing a request received by the agent, the agent may store and/or retrieve configuration information for a particular physical disk or LUN. The agent may use the first data structure, the hash table, to locate a first node in the second data structure, the TLD binary tree, corresponding to the particular LUN or physical disk. The first node may be located by determining the appropriate hash table element based on the tag value for TAG LUN. The linked list of elements having the same hash value may be traversed to determine which element corresponds to the particular LUN of interest. The first node may represent the root of a subtree, (e.g., a portion of the second data structure) which may be further searched to locate the appropriate nodes to which information is stored and/or retrieved. In other words, the hash table may be used to facilitate location of a particular node in the TLD binary tree rather than begin searching from the root. From this point, the TLD binary tree structure and its relationships may be used. Whether a particular one or both of the data structures used to form the combination data structure are used in connection with a request may vary in accordance with the particular configuration information and request.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for accessing data comprising:
   storing the data in a tree data structure at a first location;
   determining a hash value in accordance with a portion of said data;
   creating an entry in a hash table in accordance with said hash value for said data;
   storing in said entry a reference identifying said first location, wherein said data is accessible at said first location using a first retrieval technique for said tree data structure and using a second retrieval technique for said hash table, wherein said tree data structure represents relationships between data stored therein, said relationships including peer relationships and embedded relationships, nodes of said tree data structure at a same peer level are represented as right children of one another, nodes of said tree data structure having an embedded relationship to another node are included in a subtree formed with a left child of said other node as a root of said subtree.

2. The method of claim 1, wherein said data is configuration information about a data storage system.

3. The method of claim 2, wherein said tree data structure includes configuration information about said data storage system in which said configuration information is stored in said tree data structure in accordance with a defined hierarchy.

4. The method of claim 3, wherein said defined hierarchy includes physical configuration information, logical configuration information, and general configuration information about said data storage system.

5. The method of claim 3, wherein said tree data structure is a binary tree, and said defined hierarchy includes said peer relationships and said embedded relationships.

6. The method of claim 3, wherein an agent of a data storage system manages said configuration information, said agent receiving configuration information in accordance with said tree data structure and said defined hierarchy.

7. The method of claim 1, further comprising:
retrieving information from said first location using said second retrieval technique, said first location corresponding to a root node of a second subtree of said tree data structure; and
retrieving other information from said second subtree using said first retrieval technique and relationships between nodes of said second subtree.

8. The method of claim 1, wherein said entry in said hash table includes a pointer to a node in said tree data structure.

9. The method of claim 1, wherein said entry in said hash table includes said data as a field of said entry and said first location corresponds to an address of said field.

10. The method of claim 1, wherein said tree data structure is a binary tree structure including nodes, each of said nodes being in accordance with a data format and a variable size, each of said nodes including a tag value identifying a type of configuration information stored in said node, wherein said hash value is determined using said tag value.

11. A method for accessing data comprising:
storing the data in a tree data structure at a first location;
determining a hash value in accordance with a portion of said data;
creating an entry in a hash table in accordance with said hash value for said data, said entry including a reference to said data at said first location, wherein said data is accessible at said first location using a first retrieval technique for said tree data structure and using a second retrieval technique for said hash table, wherein said data is configuration information about a data storage system, wherein said tree data structure includes configuration information about said data storage system in which said configuration information is stored in said tree data structure in accordance with a defined hierarchy, and wherein an agent of a data storage system manages said configuration information, said agent receiving configuration information in accordance with said tree data structure and said defined hierarchy;
a driver communicating configuration information in a first format to a first routine, wherein said first routine uses one or more other routines to convert said first format to said tree data structure;
sending said configuration information from said first routine in the form of said tree data structure to said agent; and
accessing, by said agent, a portion of a combination data structure including said hash table and said tree data structure in connection with servicing a request.

12. The method of claim 11, wherein, in connection with servicing a request, said agent updates said combination data structure with configuration information included in said tree data structure, wherein said agent uses one or more of said first retrieval technique and said second retrieval technique in connection with performing said update.

13. The method of claim 11, wherein, in connection with servicing said request, said agent retrieves configuration information from said combination data structure, wherein said agent uses one or more of said first retrieval technique and said second retrieval technique in connection with performing said accessing to retrieve requested configuration information, said requested configuration information being returned in a response.

14. The method of claim 11, wherein said data storage system includes a plurality of drivers, each of said drivers using a different library in accordance with a particular format of data used by said each driver, and wherein each of the different libraries uses a same library in connection with converting data in said particular format to said tree data structure utilized by said agent.

15. A method for accessing data comprising:
storing the data in a first data structure at a first location, said first data structure representing hierarchical relationships between elements thereof in accordance with a defined hierarchy;
determining a hash value in accordance with a portion of said data;
creating an entry in a hash table in accordance with said hash value for said data;
storing in said entry a reference identifying said first location, wherein said data is accessible at said first location using a first retrieval technique for said first data structure and using a second retrieval technique for said hash table, wherein said first data structure represents relationships between data stored therein, said relationships including peer relationships and embedded relationships, nodes of said first data structure at a same peer level are represented as right children of one another, nodes of said first data structure having an embedded relationship to another node are included in a subtree formed with a left child of said other node as a root of said subtree.

16. A computer-readable medium including executable code stored thereon for accessing data, the computer-readable medium including executable code that:
stores the data in a tree data structure at a first location;
determines a hash value in accordance with a portion of said data;
creates an entry in a hash table in accordance with said hash value for said data;
stores in said entry a reference identifying said first location, wherein said data is accessible at said first location using a first retrieval technique for said tree data structure and using a second retrieval technique for said hash table, wherein said tree data structure represents relationships between data stored therein, said relationships including peer relationships and embedded relationships, nodes of said tree data structure at a same peer level are represented as right children of one another, nodes of said tree data structure having an embedded relationship to another node are included in a subtree formed with a left child of said other node as a root of said subtree.

17. The computer-readable medium of claim 16, wherein said data is configuration information about a data storage system.

18. The computer-readable medium of claim 17, wherein said tree data structure includes configuration information about said data storage system in which said configuration information is stored in said tree data structure in accordance with a defined hierarchy, and wherein said defined hierarchy includes physical configuration information, logical configuration information, and general configuration information about said data storage system.

19. The computer-readable medium of claim 18, wherein said tree data structure is a binary tree, and said defined hierarchy includes said peer relationships and said embedded relationships.

20. The computer-readable medium of claim 16 further comprising executable code that:

retrieves information from said first location using said second retrieval technique, said first location corresponding to a root node of a second subtree of said tree data structure; and retrieves other information from said second subtree using said first retrieval technique and relationships between nodes of said second subtree.

* * * * *